United States Patent [19]

Shirley

[11] Patent Number: 4,609,087
[45] Date of Patent: Sep. 2, 1986

[54] MOTOR VEHICLE TRANSMISSION HAVING CLUTCH OPERATING HYDRAULIC CYLINDER

[75] Inventor: Graham J. Shirley, Troy, Mich.

[73] Assignee: Automotive Products plc, Warwickshire, England

[21] Appl. No.: 469,284

[22] Filed: Feb. 24, 1983

[30] Foreign Application Priority Data

May 28, 1982 [GB] United Kingdom ............... 8215789

[51] Int. Cl.⁴ ................... F16D 25/08; F16D 25/12
[52] U.S. Cl. ........................ 192/85 CA; 192/91 A; 192/98
[58] Field of Search ............. 192/85 CA, 91 A, 85 R, 192/30 V, 98, 3.57, 88 A

[56] References Cited

U.S. PATENT DOCUMENTS

| 2,057,744 | 10/1936 | Sanford | 192/91 A X |
|---|---|---|---|
| 2,593,192 | 4/1952 | Rockwell | 192/91 A X |
| 3,131,796 | 5/1964 | Youngs, III | 192/85 CA |
| 3,334,717 | 8/1967 | Spokas et al. | 192/91 A X |
| 3,610,384 | 10/1971 | Borck | 192/98 X |
| 3,687,253 | 8/1972 | Bjorklund | 192/91 A |
| 3,743,070 | 7/1973 | Howard et al. | 192/91 A X |
| 3,749,217 | 7/1973 | Bush et al. | 192/98 X |
| 3,907,085 | 9/1975 | Rist | 192/85 CA X |
| 4,382,497 | 5/1983 | Sakai et al. | 192/113 A |

FOREIGN PATENT DOCUMENTS

| 3021386 | 12/1981 | Fed. Rep. of Germany | 192/85 CA |
|---|---|---|---|
| 0599807 | 3/1948 | United Kingdom | . |
| 1027925 | 4/1966 | United Kingdom | . |
| 1291103 | 9/1972 | United Kingdom | 192/91 A |
| 1539879 | 2/1979 | United Kingdom | . |

OTHER PUBLICATIONS

1973 Dodge Colt Service Manual, pp. 1-1, 1-2 and 1-10, 1973.

Primary Examiner—Rodney H. Bonck
Attorney, Agent, or Firm—Hauke and Patalidis

[57] ABSTRACT

In a motor vehicle transmission comprising a clutch disposed in a bell housing and a gearbox having an input shaft driven through the clutch, the bell housing having a mounting face attached upon a corresponding mounting face on the gearbox, an annular hydraulic slave cylinder disposed concentric with the gearbox input shaft operable to release the clutch, the slave cylinder has a radially outward projecting portion provided with a passageway connected to a line in turn connected to a master cylinder. The radially outward projecting portion of the slave cylinder is sandwiched between the mounting face of the bell housing and the gearbox housing, preferably in a groove formed in the inner face of the bell housing. Such a structure permits to assemble the whole hydraulic system and fill the system with hydraulic fluid prior to installation on a motor vehicle.

6 Claims, 5 Drawing Figures

MOTOR VEHICLE TRANSMISSION HAVING CLUTCH OPERATING HYDRAULIC CYLINDER

BACKGROUND OF THE INVENTION

This invention relates to a motor vehicle transmission and more particularly to transmissions having a clutch and a gearbox whose input shaft is driven through the clutch so that the drive to the gearbox is broken by operation of the clutch by a hydraulically operable annular slave cylinder arranged concentrically with the gearbox input shaft.

Transmissions of the above type are known and examples are illustrated in British Patent No. 1,027,925 and British Patent No. 599,807. However, disadvantages of this type of transmission are that (a) the concentric slave cylinder must be made rotationally and axially fast relative to the gearbox and this is usually done by bolting the slave cylinder housing to a face on the gearbox within the gearbox bell housing, and (b) the hydraulic connections to the slave cylinder are located within the bell housing and are difficult to reach for servicing purposes when the gearbox is assembled to a vehicle engine.

The present invention provides a motor vehicle transmission having a hydraulic slave cylinder arranged concentrically with the gearbox input shaft and in which the aforementioned problems have been overcome.

SUMMARY OF THE INVENTION

Accordingly there is provided a motor vehicle transmission including a clutch, a gearbox assembly having an input shaft driven by the clutch, a bell housing enveloping the clutch and having a face thereon, a gearbox casing housing the gearbox and having a face thereon so that when the bell housing and casing are assembled the two faces contact, and an annular hydraulic slave cylinder concentric with the gearbox input shaft and operable to release the clutch to break drive to the input shaft wherein the slave cylinder has a radially outward projection thereon whereby hydraulic fluid is fed into the cylinder and said projection is sandwiched between opposed surfaces on the faces and extends outwardly of the casing.

Trapping the outward projection between the two faces on the different portions of the gearbox assembly prevents rotation and limits axial movement of the hydraulic cylinder.

Conveniently, a groove is formed in the bell housing face to house the slave cylinder outward projection.

This invention is particularly useful with pre-filled clutch hydraulic systems in which a clutch hydraulic actuator system is assembled together and filled and bled prior to installation on a vehicle, such a system is illustrated in British Patent No. 1,539,879.

The invention will be described by way of example and with reference to the accompanying drawings in which:

DETAILED DESCRIPTION OF THE PREFERRED EMBODIMENT

Figure 1:
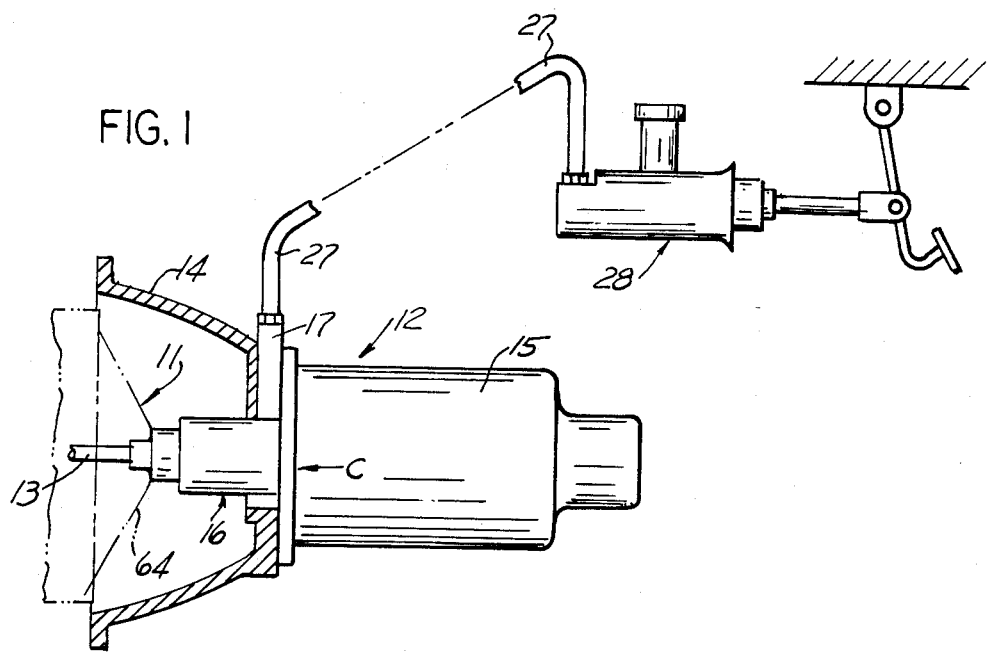
FIG. 1 is a sketch of the gearbox and clutch actuator in assembly for a transmission.

Now with reference to FIGS. 1, 3, 4 and 5 of the drawings, a motor vehicle transmission includes a friction clutch 11, and a gearbox assembly 12. The gearbox assembly 12, FIG. 1, has an input shaft 13 driven by the clutch 11, a bell housing 14 which houses the clutch 11 and which, in use, is bolted against a face on an internal combustion engine (not shown), and a gearbox casing 15 which houses the gear trains. The bell housing 14 and gearbox casing 15 are formed as separable components, the bell housing 14 generally being bolted to the casing 15. An annular hydraulic clutch slave cylinder 16 is arranged concentrically with the input shaft 13 and has a radially outwardly projecting portion or boss 17 (radially outwardly with respect to the input shaft 13). The projecting portion or boss 17 is sandwiched between opposed faces 21 and 22, FIGS. 3-5, on the bell housing 14 and casing 15, respectively, and is accommodated in a groove 18 on the bell housing face 21. The outline of the gearbox casing 15 is shown in dotted lines 20 at FIG. 3.

Figure 3:
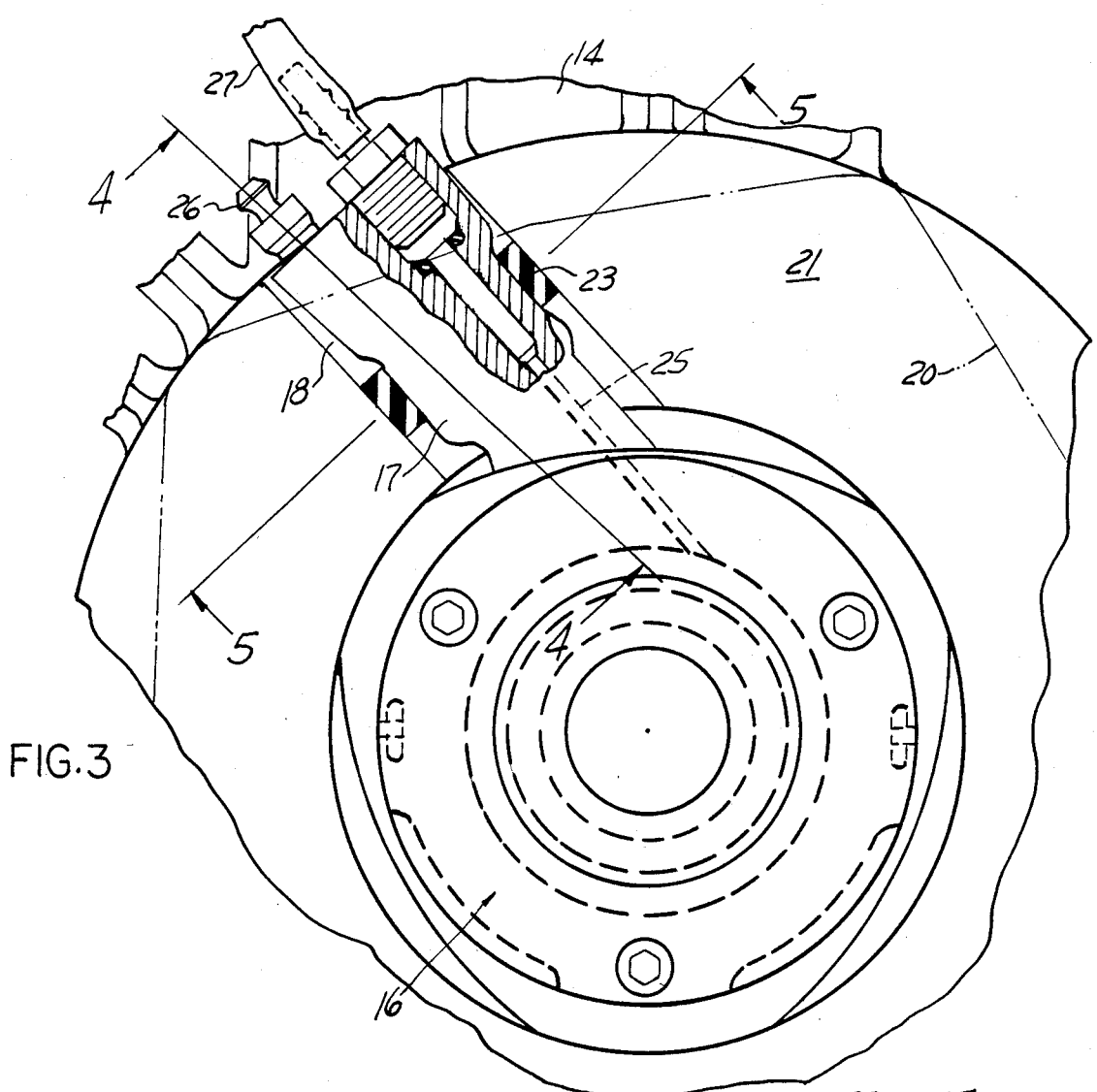
FIG. 3 is a view in the direction of arrow C of FIG. 1 of the slave cylinder in position on the bell housing and also showing the outline of the gearbox housing in dotted lines.
Figure 4:
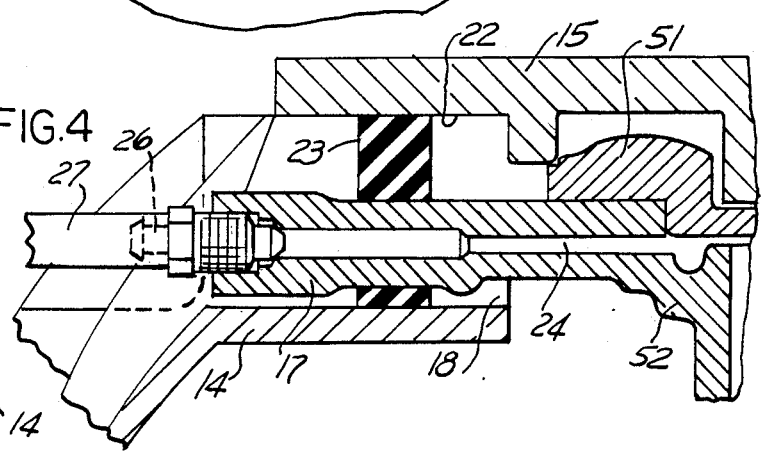
FIG. 4 is a section on the line 4—4 in FIG. 3.
Figure 5:
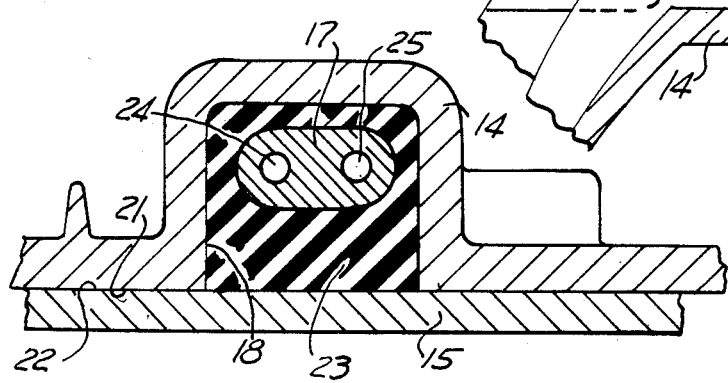
FIG. 5 is a section on the line 5—5 in FIG. 3.

The projecting portion or boss 17 extends outwards substantially tangentially to the annular slave cylinder 16 and is located in the groove 18 by an elastomeric collar 23, FIGS. 3-5. There are a pair of fluid passageways 24 and 25 running the length of the projecting portion or boss 17 into the slave cylinder. One of the passageways 24 has a bleed nipple 26 at its outer end and the other passageway 25 is connected through a hydraulic fluid conduit 27 to a master cylinder 28.

Figure 2:
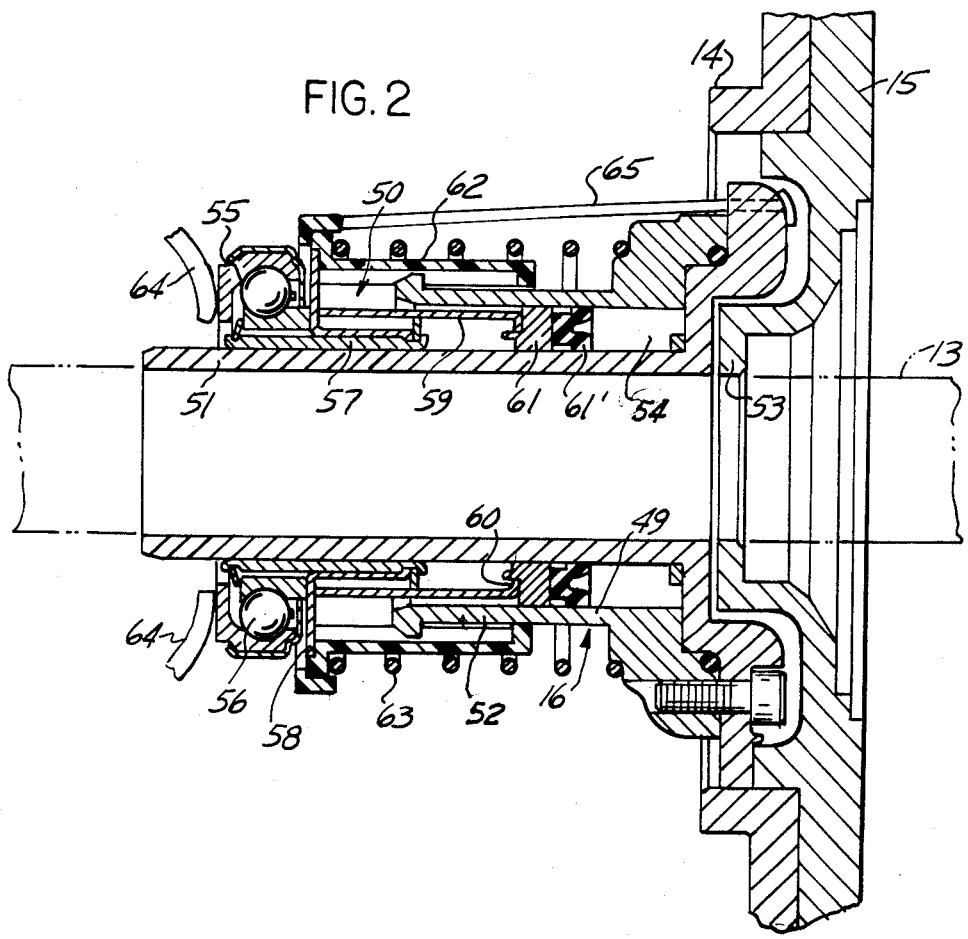
FIG. 2 is a longitudinal section through a clutch hydraulic slave cylinder and release bearing as are utilized in the assembly shown in FIG. 1.

The clutch slave cylinder 16, FIG. 2, comprises an annular cylinder 49 formed from two aluminum tubular bodies 51 and 52 which are concentric and are sealingly bolted together. It could be arranged that the inner tubular body 51 fits over a flange on the end of the gearbox casing and surrounds the input shaft 13 or, as in the illustrated example of structure, the inner body 51 is extended radially to locate on a flange 53 formed in the bell housing 14. An annular hydraulic chamber 54 formed between the two tubular bodies 51 and 52 is connected to the passageways 24 and 25 in the projection portion or boss 17. The projecting portion or boss 17 is formed as an integral part of the outer tubular body 52. The inner tubular body 51 extends axially beyond the outer tubular body 52 towards the clutch to provide a guide and support for axial movement of a release bearing assembly 55. The release bearing assembly comprises a rolling element bearing 56, the stationary inner race of which is carried on a fabricated carrier 50. The carrier 50 has a sleeve portion 57 that slides on the periphery of the inner tubular body 51, a radial annular flange 58 that carries the rolling element bearing 56, and a tubular sleeve 59 having a rear flange which locates and guides the tubular sleeve 59. The rear flange 60 of the tubular sleeve 59 which is attached to an annular piston 61 provided with a sealing ring 61' and slidably disposed in the hydraulic chamber 54, such as to transmit the displacement of the piston 64 pressure to the flange 58. The outer periphery of the flange 58 carries an annular skirt 62 to prevent dust from entering the slave cylinder 16.

A coil spring 63 external of the slave cylinder 16 and concentric therewith, acts between the flange 58 and the periphery of the outer tubular body 52 to urge the rolling element bearing against the fingers 64 of a diaphragm spring when the cylinder is in use on a vehicle. Before fitting the slave cylinder into its operative position the piston 61 and release bearing assembly are retained in their retracted positions by a shipping strap 65 which is subsequently ruptured on the first actuation of the slave cylinder.

This invention is particularly useful for clutch hydraulic control systems which are assembled, filled, and bled prior to fitting to the vehicle. This type of transmission structure allows the concentric slave cylinder to be fitted without breaking the hydraulic connections in the system and also provides for ease of servicing during the later life of the vehicle if, for example, the clutch control system required bleeding.

I claim:

1. In a motor vehicle transmission comprising a clutch, a gearbox assembly having an input shaft driven by the clutch, a bell housing enveloping the clutch and having a face thereon, a gearbox casing housing the gearbox and having a face thereon, whereby the bell housing and the gearbox casing are assembled with the bell housing face and the gearbox casing face in mutual engagement, and an annular hydraulic slave cylinder concentric with the gearbox input shaft and operable to release the clutch to break drive to the input shaft, said slave cylinder comprising an outer tubular body and an inner tubular body disposed concentric to and spaced apart from the outer tubular body, the improvement comprising the slave cylinder having a radially and outwardly projecting portion formed integrally with the outer tubular member of the slave cylinder, a passageway for hydraulic fluid being fed from a master cylinder into the slave cylinder disposed in said radially and outwardly projecting portion, a conduit having an end connected to said passageway and another end to the master cylinder, and means holding said radially and outwardly projecting portion sandwiched between opposed surfaces on the faces of said bell housing and said gearbox casing.

2. The improvement of claim 1, wherein the radially and outwardly projecting portion of the slave cylinder is further provided with a bleed nipple whereby the slave cylinder may be bled.

3. The improvement of claim 2 wherein the means holding said radially and outwardly projecting portion comprises a groove formed in the face of the bell housing to accommodate said projecting portion.

4. The improvement of claim 3, wherein the means holding the radially and outwardly projecting portion of the slave cylinder comprises an elastomeric collar located within the groove in the bell housing and surrounding said projecting portion.

5. The improvement of claim 1, wherein the means holding said radially and outwardly projecting portion comprises a groove formed in the face of the bell housing to accommodate said projecting portion.

6. The improvement of claim 5, wherein the means holding the radially and outwardly projecting portion of the slave cylinder comprises an elastomeric collar located within the groove in the bell housing and surrounding said projecting portion.

* * * * *